United States Patent
Logan

(12) United States Patent     (10) Patent No.: US 7,399,542 B2
Logan     (45) Date of Patent: Jul. 15, 2008

(54) FUEL CELL SYSTEM BURP CONTROL

(75) Inventor: Victor W. Logan, Naples, NY (US)

(73) Assignee: General Motors Corporation, Detroit, MI (US)

( * ) Notice: Subject to any disclaimer, the term of this patent is extended or adjusted under 35 U.S.C. 154(b) by 747 days.

(21) Appl. No.: 10/780,489

(22) Filed: Feb. 17, 2004

(65) Prior Publication Data

US 2005/0181249 A1    Aug. 18, 2005

(51) Int. Cl.
    *H01M 8/04*     (2006.01)
    *H01M 8/12*     (2006.01)

(52) U.S. Cl. .......................... 429/22; 429/25

(58) Field of Classification Search ................. None
See application file for complete search history.

(56) References Cited

U.S. PATENT DOCUMENTS 4,904,547 A * 2/1990 Mizumoto et al. ............ 429/22
5,059,494 A * 10/1991 Vartanian et al. ............. 429/17
5,460,896 A * 10/1995 Takada et al. ................ 429/33
6,103,409 A * 8/2000 DiPierno Bosco et al. .... 429/13
6,569,549 B1 5/2003 Sawyer ......................... 429/13

\* cited by examiner

*Primary Examiner*—Patrick Ryan
*Assistant Examiner*—Julian Mercado

(57) ABSTRACT

Fuel cell parameters and limited electrochemical fuel cell sensors are used to calculate the concentration of diluting gas on the anode side of the fuel cell. The calculated concentration is then used to optimize fuel cell efficiency and/or stability by controlling the evacuation of diluted fuel from the anode side of the cell. In accordance with one embodiment of the present invention the dilution gas crossover rate of the membrane electrode assembly is calculated and the dilution gas concentration in the anode flow field is determined as a function of the crossover rate. The vent valve is opened when the dilution gas concentration in the anode flow field is above a high threshold value and is closed when the dilution gas concentration in the anode flow field is below a low threshold value.

28 Claims, 2 Drawing Sheets

FUEL CELL SYSTEM BURP CONTROL

BACKGROUND OF THE INVENTION

The present invention relates to the electrochemical generation of power and, more specifically, to electrochemical fuel cells where diluting gases migrate from the cathode side of the cell's membrane electrode assembly to the anode side of the cell's membrane electrode assembly. For example, by way of illustration and not limitation, where oxygen from air is used as a cathode-side reactant in a fuel cell and hydrogen is used as the anode-side reactant in the fuel cell, the partial pressure of nitrogen in the air drives nitrogen through the membrane electrode assembly from the cathode side to the anode side, diluting the hydrogen fuel on the anode side of the fuel cell and leading to poor fuel cell performance.

BRIEF SUMMARY OF THE INVENTION

According to the present invention, fuel cell parameters and limited electrochemical fuel cell sensors are used to calculate the concentration of diluting gas on the anode side of the fuel cell. The calculated concentration is then used to optimize fuel cell efficiency and/or stability by controlling the evacuation of diluted fuel from the anode side of the cell.

In accordance with one embodiment of the present invention a device comprising an electrochemical fuel cell is provided. The fuel cell comprises a membrane electrode assembly interposed between an anode flow field and a cathode flow field of the fuel cell. A first reactant supply and a cathode flow field exhaust are placed in communication with the cathode flow field. Similarly, a second reactant supply and an anode flow field vent valve are placed in communication with the anode flow field. At least one condition monitor is configured to generate a signal indicative of a condition of a component of the fuel cell. A vent valve controller is programmed to control an operating state of the vent valve as a function of the condition signal and a calculated dilution gas crossover rate of the membrane electrode assembly.

In accordance with another embodiment of the present invention, the concentration of dilution gas in the anode flow field is determined as a function of a calculated dilution gas crossover rate of the membrane electrode assembly. The vent valve is opened when the dilution gas concentration in the anode flow field is above a high threshold value and is closed when the dilution gas concentration in the anode flow field is below a low threshold value. To facilitate venting, the diluted anode gas is displaced with non-diluted reactant.

In accordance with yet another embodiment of the present invention, the dilution gas concentration is determined as a function of a signal indicative of a condition of a component of the fuel cell, a calculated dilution gas crossover rate of the membrane electrode assembly, or combinations thereof.

In accordance with yet another embodiment of the present invention, a method of operating a device comprising an electrochemical fuel cell is provided. According to the method, the dilution gas crossover rate of the membrane electrode assembly is calculated and the dilution gas concentration in the anode flow field is determined as a function of the calculated dilution gas crossover rate of the membrane electrode assembly. The vent valve is opened when the dilution gas concentration in the anode flow field is above a high threshold value and is closed when the dilution gas concentration in the anode flow field is below a low threshold value.

Accordingly, it is an object of the present invention to provide an improved scheme for venting dilution gases from fuel cell anode flow fields. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals.

DETAILED DESCRIPTION

Figure 1:
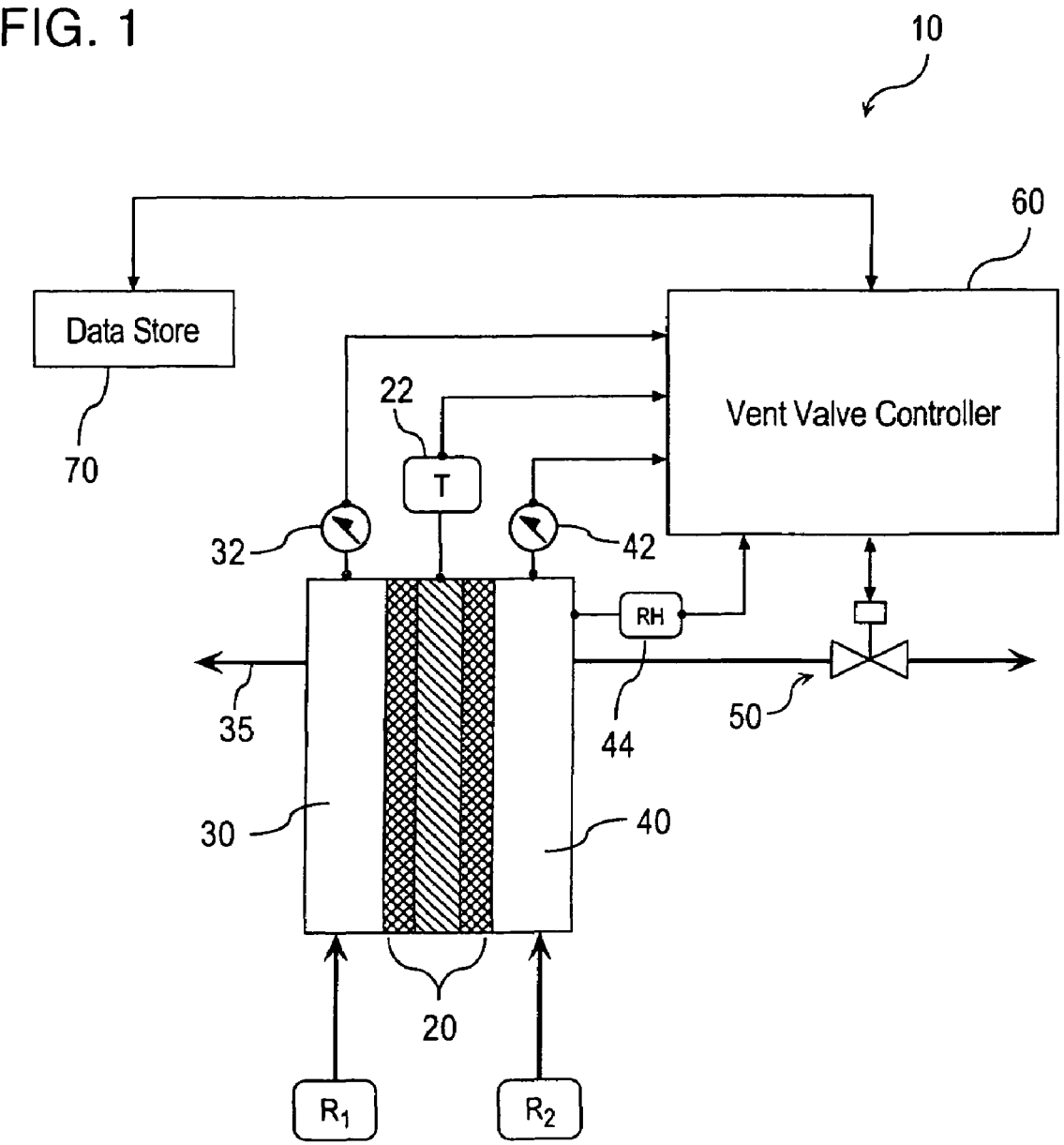
FIG. 1 is a schematic illustration of an electrochemical fuel cell according to the present invention.

Referring to FIG. 1, an electrochemical fuel cell 10 is illustrated schematically and comprises a membrane electrode assembly 20 interposed between a cathode flow field 30 and an anode flow field 40 of the fuel cell 10. A first reactant supply $R_1$ and a cathode flow field exhaust 35 communicate with the cathode flow field 30. A second reactant supply $R_2$ and an anode flow field vent valve 50 communicate with the anode flow field 40.

A variety of condition monitors are configured to generate signals indicative of respective conditions of components of the fuel cell 10. Condition signals generated according to the present invention may be utilized in a variety of ways. For example, one or more condition signals may be utilized to calculate the dilution gas crossover rate or to calculate a quantity of dilution gas entering or exiting the anode flow field 40.

As is illustrated in FIG. 1, condition monitors according to the present invention may comprise a cathode flow field pressure sensor 32 configured to monitor gas pressure within the cathode flow field 30 and an anode flow field pressure sensor 42 configured to monitor gas pressure within the anode flow field 40. The cathode flow field pressure sensor 32 can be used to generate a signal indicative of the partial pressure of the dilution gas within the cathode flow field 30 and the anode flow field pressure sensor 42 can be used to generate a signal indicative of the partial pressure of the dilution gas within the anode flow field 40. As is described in further detail below, these partial pressure values, a relative humidity value generated by a relative humidity sensor 44, and a value generated by temperature sensor 22 configured to monitor a temperature of a component (e.g., the coolant) of the fuel cell 10, can be used in the dilution gas crossover rate calculation of the present invention. Pressure and temperature signals utilized according to the present invention may be generated in a variety of suitable ways. For example, pressure signals can be derived from pressure transducers, cathode or anode mass flow monitors, algorithms, models, etc.

A vent valve controller 60 is programmed to control the operating state of the vent valve 50 as a function of the dilution gas concentration in the anode flow field, as calculated from the condition signal(s) and a calculated dilution gas crossover rate of the membrane electrode assembly 20. In this manner, the vent valve controller 60 according to the present invention can control the operating state of the vent valve 50 independent of the operating output voltage of the fuel cell 10.

The anode flow field vent valve 50 is preferably an electrically actuated solenoid or other suitable valve that enables the controller 60 to monitor and control the operating state of the vent valve 50. More specifically, the vent valve 50 and controller 60 can be configured to cooperate to enable monitoring and control of the amount of gas passing there through. In this manner, further operating condition data may be provided to enable more precise control of fuel cell operations according to the present invention. For example, according to one aspect of the present invention, the flow rate Q across the vent valve 50 is determined by utilizing one of the following two relations:

$$Q = 16.05 * C_v \sqrt{\frac{P_1^2 - P_2^2}{T(°R) * S_g}} \quad \text{(where } \frac{P_1}{P_2} < 1.89 \text{) and}$$

$$Q = 13.63 * C_v * P_1 \sqrt{\frac{1}{T(°R) * S_g}} \quad \text{(where } \frac{P_1}{P_2} > 1.89 \text{) and}$$

where $P_1$ and $P_2$ represent respective absolute pressures at the inlet and outlet of the valve, T represents temperature, $S_g$ represents the specific gravity of the gas flowing through the valve, and $C_v$ represents the valve flow coefficient (defined as gallons of water per minute at 1 psid and 60° F.). The specific gravity $S_g$ of the gas can be determined according to the following equation:

$$S_g = \frac{MW_{gas}}{MW_{air}}$$

where $MW_{gas}$ and $MW_{air}$ denote the respective molecular weights of gas and air. In the context of $H_2$, $H_2O$, $N_2$ and $O_2$ moving through the valve, the specific gravity of the gas can be determined according to the following equation utilizing the respective molar fractions mf of the various components moving through the valve:

$$S_g = \frac{mf_{H_2} * 2.016 + mf_{H_2O} * 18.015 + mf_{N_2} * 28.013 + mf_{O_2} * 31.999}{(0.0126 * 18.015) + (0.7815 * 28.013) + (0.2059 * 31.999)}$$

The flow rate Q across the vent valve 50 can also be determined by utilizing the following relation derived from Darcy's equation for the flow of compressible fluids:

$$Q = 1360 * F_p * C_v * P_1 * Y * \sqrt{\frac{x}{S_g * T_1 * Z}}$$

where Q is in standard cubic feet per hour, $C_v$ is the valve flow coefficient defined as gallons of water per minute at 1 psid at 60° F., $P_1$ is upstream pressure in pounds per square inch absolute, $P_2$ is downstream pressure in pounds per square inch absolute, Y is the expansion factor, x is the pressure drop ratio, Sg is the specific gravity of the gas through the valve, $T_1$ is the temperature of the gas, Z is the compressibility factor. When the valve inlet and outlet piping is sized properly, the piping factor $F_p$ can be taken as ~1. In the context of $O_2$, $N_2$, $H_2$, and $H_2O$, the compressibility factor Z can be taken as ~1.

The expansion factor Y can be taken as:

$$Y = 1 - \frac{x}{3 * F_k * x_t}$$

where $$F_k = \frac{k}{1.4},$$

x is the pressure drop ratio, $x_t$ is the terminal pressure drop ratio, $F_k$ is the ratio of specific heat factor (about 1 in the context of $O_2$, $N_2$, $H_2$, and $H_2O$), and K is the ratio of specific heats (about 1.39 in the context of $O_2$, $N_2$, $H_2$, and $H_2O$). The pressure drop ratio x is $$x = \frac{P_1 - P_2}{P_1}.$$

The terminal pressure drop ratio $x_t$ is specific to a valve's geometry and may be determined experimentally. When $x > F_k * x_t$ the flow is critical and $F_k * x_t$ can be used in place of x in the flow rate equation:

$$Q = 1360 * C_v * P_1 * Y * \sqrt{\frac{F_k * x_T}{S_g * T_1}}$$

The dilution gas crossover rate of the fuel cell 10 may be calculated from model fuel cell parameters, physical measurements of the fuel cell, operational parameters of the fuel cell, sensed operating conditions of the fuel cell, or combinations thereof. According to one embodiment of the present invention, the dilution gas crossover rate of the fuel cell is calculated as a function of fuel cell temperature and an estimate of nitrogen partial pressure across the membrane electrode assembly. More specifically, the dilution gas crossover rate Vi can be calculated from data representing $P_i$, a temperature dependent permeation coefficient of the membrane; A, membrane surface area; $\Delta p_i$, partial pressure differential of the dilution gas across the membrane; and t membrane thickness. The following equation is representative of such a calculation:

$$V_{N_2} = 10^{-10} \frac{P_{N_2} A \Delta p_{N_2}}{t}.$$

As is noted above, the permeation coefficient Pi of the membrane electrode assembly can be determined as a function of fuel cell temperature. For example, where the dilution gas comprises nitrogen and the membrane electrode assembly comprises NAFION, the permeation coefficient $P_i$ of the membrane can be determined according to the following equation:

$$P_{N_2} = 3.07 * 10^4 e^{-2160/T}$$

where T represents fuel cell temperature. It is contemplated that the permeation coefficients of similar materials can be represented with similar or analogous equations while different types of materials can be represented by different permeation coefficient equations.

It is noted that many dilution gas crossover rate calculations according to the present invention will necessitate an estimation of nitrogen partial pressure across the membrane electrode assembly. An estimation or determination of nitrogen partial pressure across the membrane electrode assembly may be made in any one of a variety of suitable ways, e.g., by integrating $\Delta P_i$ across the membrane, utilizing partial pressure determinations on opposite sides of the membrane, etc. Specifically, an estimate can be determined from $N_C$ and $N_A$, where $N_C$ represents nitrogen partial pressure in the cathode flow field and $N_A$ represents nitrogen partial pressure in the anode flow field. The nitrogen partial pressure in the cathode flow field $N_C$ can be determined from the molar fraction of nitrogen in the first reactant supply and cathode flow field temperature, pressure, and $H_2O$ vaporization pressure. The cathode flow field temperature and pressure can be taken as an average of a measurement at an inlet of the cathode flow field and an outlet of the cathode flow field.

The nitrogen partial pressure in the anode flow field $N_A$ can be determined from the molar fraction of nitrogen in the anode flow field $mf_{N_2}$ and anode flow field pressure $P_{tot}$:

$$mf_{N_2} = \frac{n_{N_2}}{n_{anode}}$$

where, $$n_{H_2O} + n_{H_2} + n_{N_2} = n_{anode}$$

then, $$N_A = P_{tot} * \frac{n_{N_2}}{n_{anode}}$$

where $n_{H_2O}$, $n_{H_2}$, $n_{N_2}$ represent respective amounts of water vapor, hydrogen, and nitrogen in the anode flow field. The amount of water vapor in the anode flow field is determined according to the following equation:

$$n_{H_2O} = \frac{RH * P_{vap} * n_{anode}}{P_{tot}}$$

where RH represents the relative humidity in the anode, $P_{vap}$ represents the vapor pressure of water in the anode, and $P_{tot}$ represents the anode operating pressure. The relative humidity RH in the anode may be determined through direct measurements or calculations based upon measured variables, estimated variables, predetermined values, and combinations thereof.

The vent valve controller 60 may be programmed to integrate the crossover rate to yield a molar fraction calculation of the dilution gas in the anode flow field 40 and calculate an aggregate dilution gas concentration in the anode flow field 40. A signal representing the amount of gas vented through the anode flow field vent valve 50 can be used to calculate the aggregate dilution gas concentration.

According to one aspect of the present invention, when the concentration of the dilution gas in the anode flow field 40 is determined as a function of the calculated dilution gas crossover rate, the vent valve 50 is opened when the dilution gas concentration in the anode flow field 40 is above a high threshold value. The valve 50 is closed when the dilution gas concentration in the anode flow field 40 is below a low threshold value. Suitable high and low threshold values will vary depending upon the requirements of the specific fuel cell system at issue. By way of example, and not limitation, in the context of a fuel cell utilizing oxygen from air as the first reactant $R_1$, and Hydrogen as the second reactant $R_2$, a suitable high threshold value corresponding to the mol fraction of the dilution gas ($N_2$) may be in the area of about 25%. A suitable low threshold value in such a context would be significantly below 25%, depending on the fuel cell requirements. The difference in the respective values of the upper and lower threshold determines how often the vent valve 50 cycles to and from an open state and how long the valve 50 remains in the open and closed states.

Although the present invention is not limited to any specific reactant compositions, it will be appreciated by those practicing the present invention and generally familiar with fuel cell technology that the first reactant supply $R_1$ typically comprises oxygen and nitrogen while the second reactant supply $R_2$ comprises hydrogen. In which case, the calculated dilution gas crossover rate corresponds to a rate at which the nitrogen from the first reactant supply $R_1$ crosses the membrane electrode assembly 20 from the cathode flow field 30 to the anode flow field 40.

The fuel cell 10 further comprises a data store 70 in communication with the vent valve controller 60. The data store preferably provides data for use in the valve control operations of the controller 60. For example, the data store 70 may be configured to provide respective dilution gas crossover rates that correspond to different sensed fuel cell component operating conditions. The data store 70 may also incorporate a plurality of fuel cell condition signal data sets and may be configured to provide respective dilution gas crossover rates that correspond to various combinations of the fuel cell condition signal data sets. For example, the fuel cell condition signal data sets may comprise a cathode flow field pressure data set and an anode flow field pressure data set and the controller may cooperate with the data store to calculate a specific dilution gas crossover rate corresponding to particular values within the cathode and anode flow field data sets. Other data sets that may be held within the data store 70 include, but are not limited to, a fuel cell temperature data set, an anode flow field vent valve data set, and combinations thereof.

Figure 2:
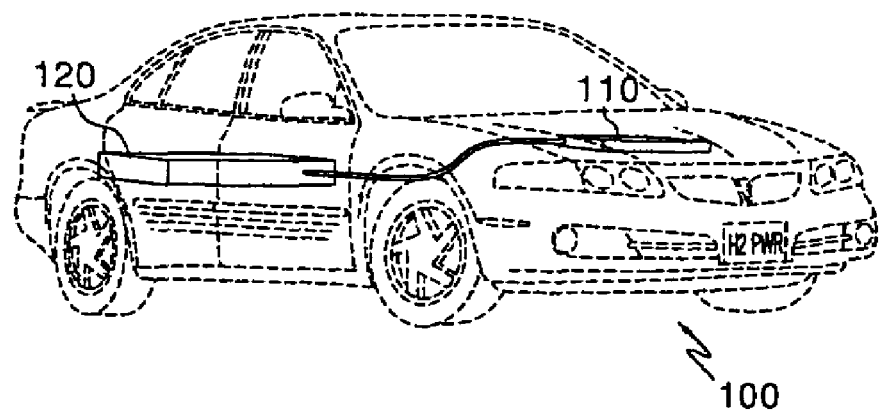
FIG. 2 is an illustration of a vehicle incorporating a fuel cell system according to the present invention.

Referring now to FIG. 2, a fuel cell system according to the present invention may be configured to operate as a source of power for a vehicle 100. Specifically, fuel from a fuel storage unit 120 may be directed to the fuel cell stack or other fuel cell assembly 110 configured to convert fuel, e.g., H2, into electricity. The electricity generated is subsequently used as a motive power supply for the vehicle 100 where the electricity is converted to torque and vehicular translational motion. It is also contemplated that a fuel cell system according to the present invention may be configured to operate as part of a stationary generator for a distributed power network.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise a fuel cell, a fuel cell stack, a vehicle incorporating a fuel cell or fuel cell stack, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

The invention claimed:

1. A device comprising:
an electrochemical fuel cell comprising
a membrane electrode assembly interposed between an anode flow field and a cathode flow field,
a first reactant supply and a cathode flow field exhaust in communication with said cathode flow field, and
a second reactant supply and an anode flow field vent valve in communication with said anode flow field;
at least one condition monitor configured to generate a signal indicative of a condition of a component of said fuel cell; and
a vent valve controller cooperative with said condition monitor such that upon receipt of said condition signal therefrom, said controller calculates a dilution gas crossover rate for said membrane electrode assembly and adjusts dilution gas concentration in at least a portion of said anode flowpath through selective manipulation of said field vent valve.

2. A device as claimed in claim 1 wherein:
a dilution gas concentration in said anode flow field is determined as a function of a calculated dilution gas crossover rate of said membrane electrode assembly; and
said vent valve is opened when said dilution gas concentration in said anode flow field is above a high threshold value and closed when said dilution gas concentration in said anode flow field is below a low threshold value.

3. A device as claimed in claim 1 wherein said dilution gas crossover rate of said fuel cell is calculated as a function of fuel cell temperature and an estimate of nitrogen partial pressure across said membrane electrode assembly.

4. A device as claimed in claim 3 wherein said estimate of nitrogen partial pressure across said membrane electrode assembly is determined from $N_C$ and $N_A$, where $N_C$ represents nitrogen partial pressure in said cathode flow field and $N_A$ represents nitrogen partial pressure in said anode flow field.

5. A device as claimed in claim 4 wherein $N_C$ is determined from the molar fraction of nitrogen in said first reactant supply and cathode flow field temperature, pressure, and $H_2O$ vaporization pressure.

6. A device as claimed in claim 5 wherein said cathode flow field temperature and pressure are taken as an average of a measurement at an inlet of said cathode flow field and an outlet of said cathode flow field.

7. A device as claimed in claim 3 wherein $N_A$ is determined from the molar fraction of nitrogen in said anode flow field $mf_{N_2}$ and anode flow field pressure $P_{tot}$.

8. A device as claimed in claim 7 wherein said molar fraction of nitrogen in said anode flow field $n_{N_2}$ is determined according to the following equations:

$$mf_{N_2} = \frac{n_{N_2}}{n_{anode}}$$

$$n_{H_2O} + n_{H_2} + n_{N_2} = n_{anode}$$

where $n_{H_2O}$, $n_{H_2}$, $n_{N_2}$ represent respective amounts of water vapor, hydrogen, and nitrogen in said anode flow field.

9. A device as claimed in claim 8 wherein the amount of water vapor in said anode flow field is determined according to the following equation:

$$n_{H_2O} = \frac{RH * P_{vap} * n_{anode}}{P_{tot}}$$

where RH represents the relative humidity in the anode, $P_{vap}$ represents the vapor pressure of water in the anode, and $P_{tot}$ represents anode pressure.

10. A device as claimed in claim 1 wherein said dilution gas crossover rate of said fuel cell is calculated utilizing the following equation:

$$V_{N_2} = 10^{-10} \frac{P_{N_2} A \Delta p_{N_2}}{t}$$

where $V_i$ represents volumetric flow across the membrane of said membrane electrode assembly, $P_i$ represents a permeation coefficient of said membrane, A represents membrane surface area, $\Delta p_i$ represents the partial pressure differential of said dilution gas across said membrane, and t represents membrane thickness.

11. A device as claimed in claim 10 wherein said permeation coefficient of said membrane is determined as a function of fuel cell temperature.

12. A device as claimed in claim 11 wherein said dilution gas comprises nitrogen, said membrane electrode assembly comprises NAFION, and said permeation coefficient $P_i$ of said membrane is determined according to the following equation:

$$P_{N_2} = 3.07 * 10^4 e^{-2160/T}$$

wherein T represents fuel cell temperature.

13. A device as claimed in claim 1 wherein said dilution gas crossover rate of said fuel cell is calculated from data representing:
$P_i$, a permeation coefficient of said membrane;
A, membrane surface area;
$\Delta p_i$, partial pressure differential of said dilution gas across said membrane; and
t membrane thickness.

14. A device as claimed in claim 1 wherein said vent valve controller is programmed to integrate said crossover rate to yield a molar fraction calculation of said dilution gas in said anode flow field.

15. A device as claimed in claim 1 wherein said vent valve controller is programmed to calculate an aggregate dilution gas concentration in said anode flow field.

16. A device as claimed in claim 15 wherein an indication of an amount of gas vented through said anode flow field vent valve is used to calculate said aggregate dilution gas concentration.

17. A device as claimed in claim 1 wherein said vent valve controller is programmed to control an operating state of said vent valve independent of an operating output voltage of said fuel cell, output voltage statistics, cell voltage decay, and combinations thereof.

18. A device as claimed in claim 1 wherein said anode flow field vent valve is configured to enable said vent valve controller to monitor and control the operating state of said vent valve.

19. A device as claimed in claim 1 wherein said anode flow field vent valve is configured to enable said vent valve controller to monitor and control an amount of gas passing through said vent valve.

20. A device as claimed in claim 1 wherein said fuel cell further comprises a data store in communication with said vent valve controller.

21. A device as claimed in claim 20 wherein said data store is configured to provide respective dilution gas crossover rates for a plurality of different fuel cell component conditions.

22. A device as claimed in claim 20 wherein said data store incorporates a plurality of fuel cell condition signal data sets and is configured to provide respective dilution gas crossover rates based upon various combinations of said fuel cell condition signal data sets.

23. A device as claimed in claim 20 wherein said fuel cell condition signal data sets comprise a cathode flow field pressure data set, an anode flow field pressure data set, a fuel cell temperature data set, an anode flow field vent valve data set, and combinations thereof.

24. A device as claimed in claim 1 wherein said device comprises a plurality of fuel cells configured as a fuel cell stack.

25. A device as claimed in claim 1 wherein said device comprises a stationary generator for distributed generation of electricity and said fuel cell is configured to operate as a source of said electricity.

26. A device as claimed in claim 1 wherein said device comprises a vehicle and said fuel cell is configured to operate as a source of electrical power for said vehicle.

27. A device comprising:
an electrochemical fuel cell comprising
a membrane electrode assembly interposed between an anode flow field and a cathode flow field,
a first reactant supply and a cathode flow field exhaust in communication with said cathode flow field, and
a second reactant supply and an anode flow field vent valve in communication with said anode flow field; and
a controller cooperative with said vent valve such that upon determination of a dilution gas concentration in said anode flow field as a function of a calculated dilution gas crossover rate of said membrane electrode assembly, said controller opens said vent valve when said dilution gas concentration in said anode flow field is above a high threshold value and closes said vent valve when said dilution gas concentration in said anode flow field is below a low threshold value.

28. A device comprising:
an electrochemical fuel cell comprising
a membrane electrode assembly interposed between an anode flow field and a cathode flow field,
a first reactant supply comprising oxygen and nitrogen and a cathode flow field exhaust in communication with said cathode flow field, and
a second reactant supply comprising hydrogen and an anode flow field vent valve in communication with said anode flow field;
a first condition monitor configured to generate a first condition signal indicative of a partial pressure of said nitrogen within said cathode flow field;
a second condition monitor configured to generate a second condition signal indicative of a partial pressure of said nitrogen within said anode flow field; and
a vent valve controller cooperative with said first and second condition monitors such that upon receipt of said signals therefrom, said controller calculates a dilution gas crossover rate of said membrane electrode assembly, wherein
said dilution gas crossover rate corresponds to a rate at which said nitrogen from said first reactant supply crosses said membrane electrode assembly from said cathode flow field to said anode flow field according to the following equation $$V_i = 10^{-10} \frac{P_i A \Delta p_i}{t}$$

where $V_i$ represents volumetric flow across the membrane of said membrane electrode assembly, $P_i$ represents a temperature dependent permeation coefficient of said membrane, A represents membrane surface area, $\Delta p_i$ represents the partial pressure differential of said nitrogen across said membrane, and t represents membrane thickness, and wherein said vent valve controller calculates an aggregate dilution gas concentration in said anode flow field utilizing said dilution gas crossover rate and an indication of an amount of gas vented through said anode flow field vent valve.

* * * * *